No. 826,216. PATENTED JULY 17, 1906.
H. E. ASBURY.
SAUSAGE STUFFER AND LARD PRESS NOZZLE.
APPLICATION FILED APR. 19, 1905.
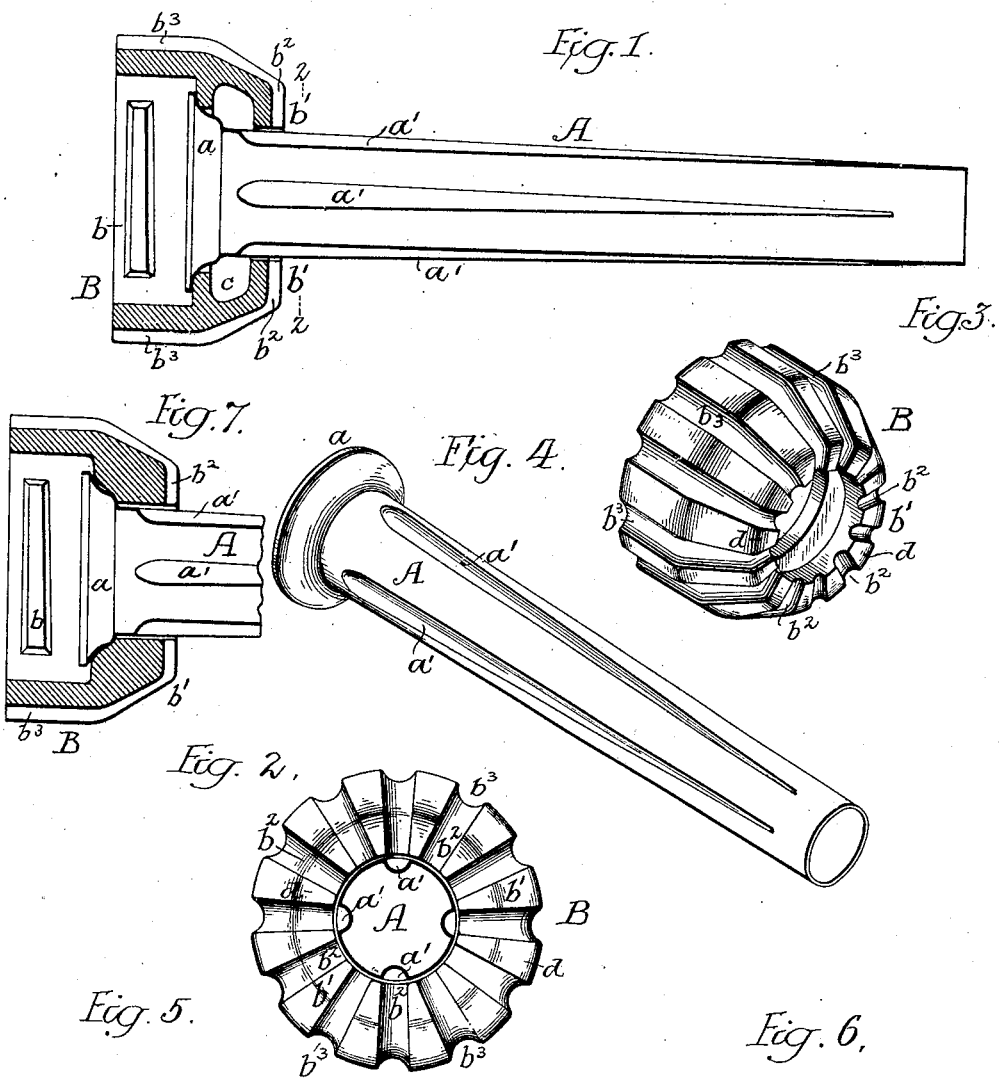
Witnesses:
Titus H. Dodds.
Wills A. Burrowes.
Inventor:
Harry E. Asbury,
by his Attorneys,
Howson & Howson

UNITED STATES PATENT OFFICE.

HARRY E. ASBURY, OF PHILADELPHIA, PENNSYLVANIA, ASSIGNOR TO THE ENTERPRISE MANUFACTURING COMPANY OF PENNSYLVANIA, OF PHILADELPHIA, PENNSYLVANIA, A CORPORATION OF PENNSYLVANIA.

SAUSAGE-STUFFER AND LARD-PRESS NOZZLE.

No. 826,216.     Specification of Letters Patent.     Patented July 17, 1906.

Application filed April 19, 1905. Serial No. 256,442.

*To all whom it may concern:*

Be it known that I, HARRY E. ASBURY, a citizen of the United States, residing in Philadelphia, Pennsylvania, have invented certain Improvements in Sausage-Stuffer and Lard-Press Nozzles, of which the following is a specification.

My invention relates to certain improvements in nozzles used in connection with sausage-stuffers and lard-presses which will allow air to escape from the casing of a sausage as it is being stuffed.

The object of my invention is to provide the coupling by which the nozzle is secured to the stuffer or press with means which will prevent the casing closing the passages in the nozzle.

In the accompanying drawings, Figure 1 is a longitudinal sectional view of a nozzle and coupling, illustrating my invention. Fig. 2 is a sectional view on the line 2 2, Fig. 1. Fig. 3 is a perspective view of the coupling. Fig. 4 is a perspective view of the nozzle. Fig. 5 is a side view, partly in section, of a modified form of my invention. Fig. 6 is an end view of Fig. 5, and Figs. 7 and 8 are views of further modifications of my invention.

A is the nozzle, preferably made tapered and cylindrical in form and having a flange $a$ at the rear end and also having one or more longitudinal grooves $a'$ formed therein, in the present instance by indenting the metal. These grooves extend from a point near the flange $a$ to a point near the outer end of the nozzle and are preferably tapered and deeper at the end near the flange than at the opposite end.

B is a coupling which can be secured to the body of the sausage-stuffer or lard-press in any suitable manner. In the present instance the coupling has tapered internal lugs $b$, which form a broken screw and correspond with similar lugs on the body of the stuffer or press. The coupling can be secured to the stuffer by turning it a half-turn, so that its lugs will engage those of the stuffer and the flange $a$ of the nozzle will be clamped between the two, making a comparatively tight joint.

In order to prevent the casing of the sausage closing the inner end of the air-grooves $a'$ in the nozzle A, I extend the body of the coupling B so that its face $b'$ will be beyond the end of the grooves $a'$. Then I form radiating grooves $b^2$ in this face, producing ribs $d$. These grooves are of sufficient depth to prevent the casing closing them. As shown in Fig. 2, there are a number of these grooves, and there are preferably more grooves in the coupling than in the nozzle, so that no matter in what position the nozzle is placed some of the grooves $b^2$ will communicate with the grooves $a'$ in the nozzle.

I may connect the grooves $b^2$ with the handhold-grooves $b^3$ in the periphery of the coupling, so as to give the article a finished appearance, as illustrated in Fig. 3.

I recess the coupling at $c$, Fig. 1, to reduce the weight of the casting, but it may be made solid, as in Fig. 7, or the recess $c$ may have one or more outlet-openings $c'$, as shown in Fig. 8 and set forth in the application referred to above.

In Figs. 5 and 6 I have shown ribs $d'$ projecting from the coupling B', these ribs forming wide spaces or grooves for the escape of the air.

I claim as my invention—

1. The combination of a grooved nozzle, with a coupling by which the nozzle is secured to the stuffer or press, said coupling having a grooved face, substantially as and for the purpose set forth.

2. The combination of a nozzle having a longitudinal groove therein, with a coupling by which the nozzle is secured to the stuffer or press, said nozzle having a face portion extending over the groove in the nozzle and having radiating grooves therein, substantially as described.

3. The combination of a longitudinally-grooved nozzle having a flange at one end, with a coupling having means whereby it can be attached to a stuffer or press, and having a flange for clamping the flange of the nozzle and also provided with a grooved face extending over the grooves in the nozzle, the grooves of the face communicating with the grooves of the nozzle, substantially as described.

4. The combination of a longitudinally-grooved nozzle, with a coupling having a grooved face, the grooves in the face of the coupling being more in number than the grooves in the nozzle, substantially as described.

5. The combination of a grooved nozzle, with a coupling therefor, said coupling having a face extending over the grooves in the nozzle and having radiating air-escape grooves, the periphery of the body of the coupling having handhold-grooves connected to the grooves in the face thereof, substantially as described.

In testimony whereof I have signed my name to this specification in the presence of two subscribing witnesses.

HARRY E. ASBURY.

Witnesses:
WILLIAM F. BEATON,
WILL. A. BARR.